United States Patent
Holt et al.

(10) Patent No.: US 6,554,210 B2
(45) Date of Patent: *Apr. 29, 2003

(54) FLUID AND AIR NOZZLE AND METHOD FOR CLEANING VEHICLE LENSES

(75) Inventors: Donald E. Holt, Woodburn, OR (US); Chester E. Lundberg, Sherwood, OR (US); Dave Austin, North Hampton, PA (US); Mike Foster, Michigan City, IN (US)

(73) Assignee: Commercial Vehicle Systems, Inc., Canby, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/804,681

(22) Filed: Mar. 12, 2001

(65) Prior Publication Data

US 2002/0005440 A1 Jan. 17, 2002

Related U.S. Application Data

(63) Continuation-in-part of application No. 09/451,257, filed on Nov. 29, 1999, now Pat. No. 6,199,773.
(60) Provisional application No. 60/138,897, filed on Jun. 11, 1999.

(51) Int. Cl.⁷ .............................. B05B 1/10; B05B 1/28; B05B 15/08; A01G 27/00
(52) U.S. Cl. ................. 239/284.2; 239/284.1; 239/292; 239/295; 239/587.1; 239/67; 239/69; 239/70
(58) Field of Search ............... 239/284.2, 284.1, 239/295, 292, 549, 587.1, 418, 433, 304, 306, 67, 69, 70, 128, 130, 133, 134; 134/57 R, 95

(56) References Cited

U.S. PATENT DOCUMENTS

| | | | |
|---|---|---|---|
| 1,752,923 A | 4/1930 | Mueller | 239/292 |
| 3,114,168 A | 12/1963 | Taylor | 15/250.02 |
| 3,448,481 A | 6/1969 | Jones, Jr. | 15/250.3 |
| 3,453,049 A | 7/1969 | Wager, Jr. | 356/73 |
| 3,456,278 A | 7/1969 | Mandy et al. | 15/250.02 |
| 3,493,804 A | 2/1970 | Fennell | 313/110 |

(List continued on next page.)

FOREIGN PATENT DOCUMENTS

| | | | |
|---|---|---|---|
| DE | 724706 | 9/1942 | 299/140.1 |
| DE | 808310 | 7/1949 | 239/295 |
| DE | 2502389 | 7/1976 | |
| DE | 3842375 | 7/1989 | |
| FR | 2605906 | 10/1986 | |
| SE | 507055 C2 * | 3/1998 | B60S/1/54 |

*Primary Examiner*—Michael Mar
*Assistant Examiner*—David Hwu
(74) *Attorney, Agent, or Firm*—Dellett and Walters

(57) ABSTRACT

Fluid and air nozzle assemblies are capable of propelling streams of a cleaning fluid and air mixture onto a vehicle vision device, visible indicator, or sensor. These nozzle assemblies are mounted on a vehicle adjacent to the vehicle vision device, visible indicator, or sensor and positioned such that liquid and air jets from the nozzles intersect prior to impinging upon the vehicle vision device, visible indicator, or sensor to form a spray mixture that cleans the vehicle vision device, visible indicator, or sensor. These nozzle assemblies have an adjustment feature for the purpose of aiming the fluid-air spray toward the vehicle vision device, visible indicator, or sensor. The nozzle assemblies are associated with a control valve capable of connection in a pressurized air system on the vehicle and in the pressurized washer system for the windshield wipers and also capable of automatically directing liquid from the vehicle washer system and pressurized air on the vehicle to the liquid and air nozzles perform cleaning of a vehicle vision device, visible indicator, or sensor upon manual activation of the pressurized windshield washer system of the vehicle, upon activation of brakes, or upon timed intervals.

30 Claims, 9 Drawing Sheets

U.S. PATENT DOCUMENTS

| | | | |
|---|---|---|---|
| 3,641,613 A | 2/1972 | Povilaitis et al. | 15/250.02 |
| 3,893,203 A | 7/1975 | Berkelius | 15/250.02 |
| 3,915,385 A | 10/1975 | Hassinger | 239/284 |
| 4,026,468 A | 5/1977 | Tinder et al. | 239/66 |
| 4,026,473 A | 5/1977 | Tinder et al. | 239/229 |
| 4,230,276 A | 10/1980 | Tinder et al. | 239/229 |
| 4,323,266 A | 4/1982 | Savage | 280/707 |
| 4,324,363 A | 4/1982 | Rauen, Jr. | 239/284 A |
| 4,354,548 A * | 10/1982 | Carlsson | 165/41 |
| 4,815,634 A | 3/1989 | Nowicki | 222/133 |
| 4,817,648 A * | 4/1989 | Sugasawa et al. | 134/57 R |
| 5,083,339 A | 1/1992 | Bristow | 15/250 A |
| 5,546,630 A | 8/1996 | Long | 15/313 |
| 5,657,929 A * | 8/1997 | DeWitt et al. | 239/284.2 |
| 6,199,773 B1 * | 3/2001 | Holt et al. | 239/284.2 |

* cited by examiner

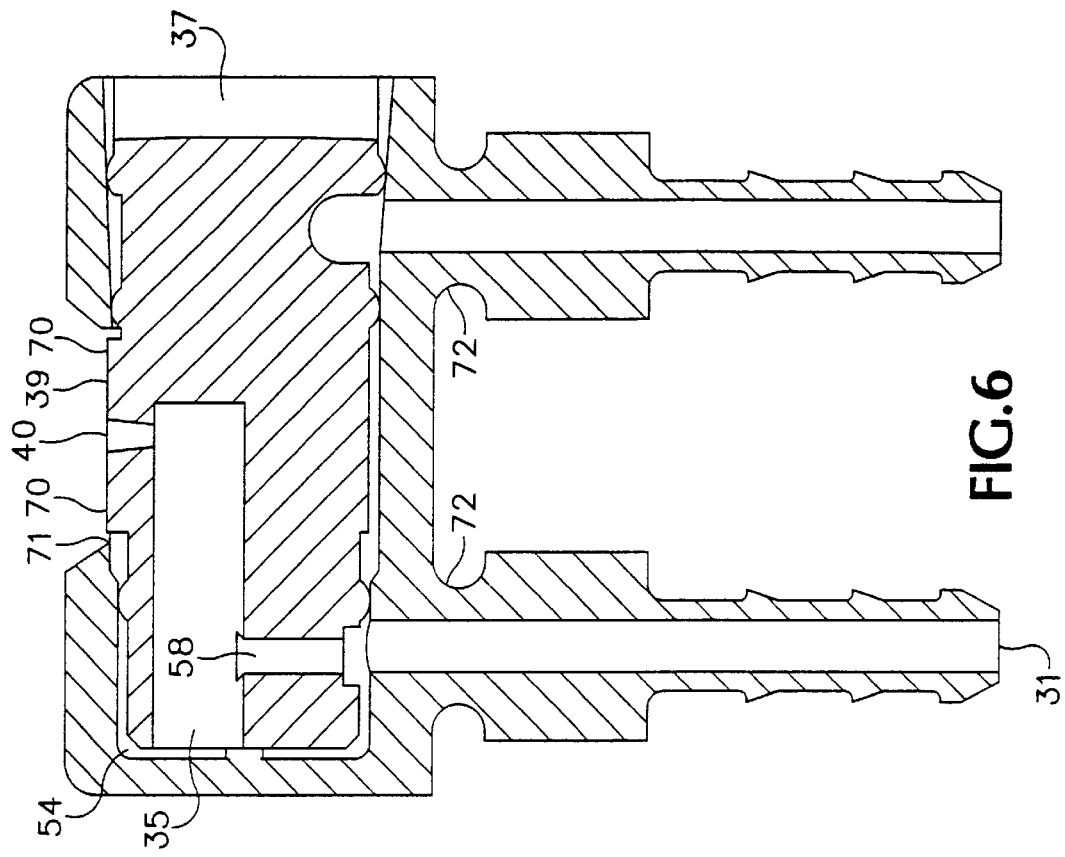
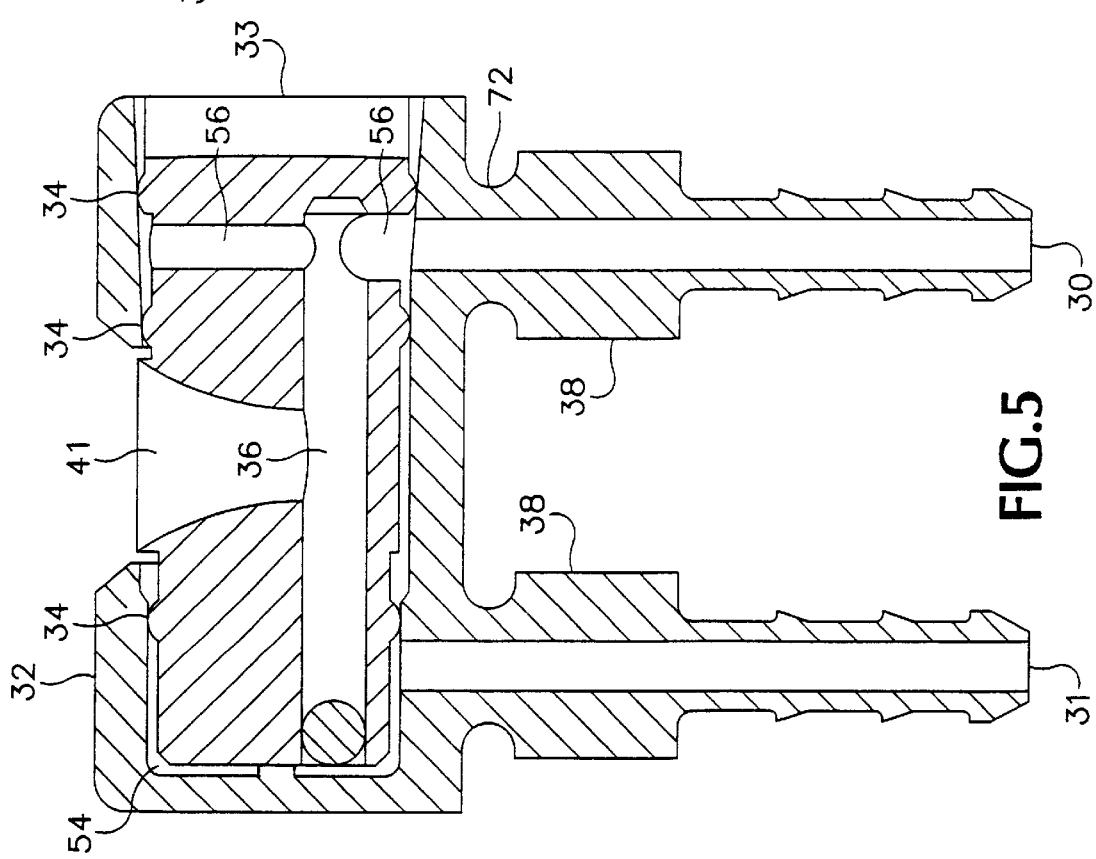

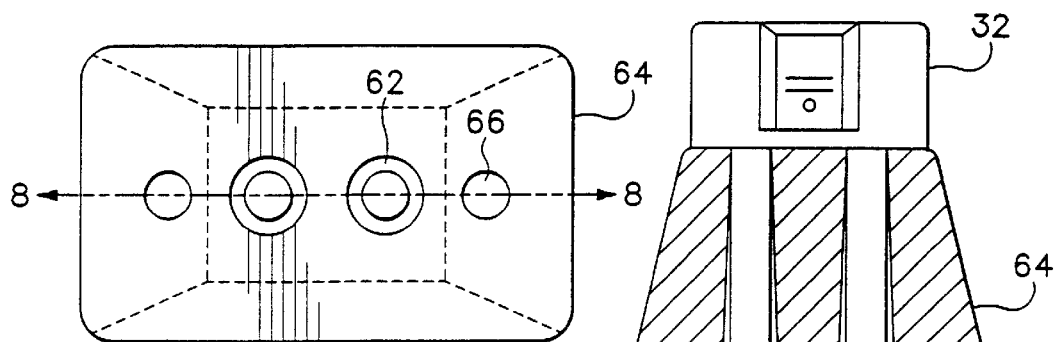
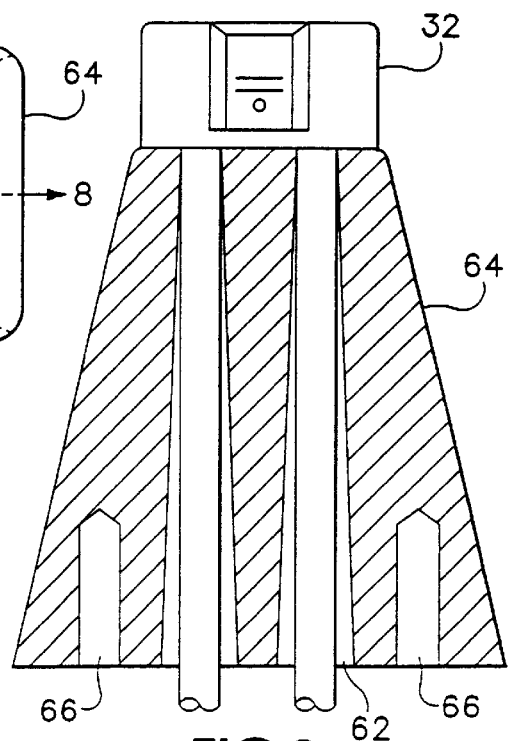
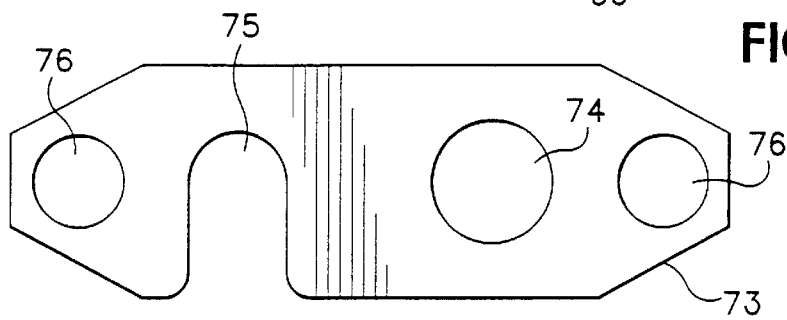
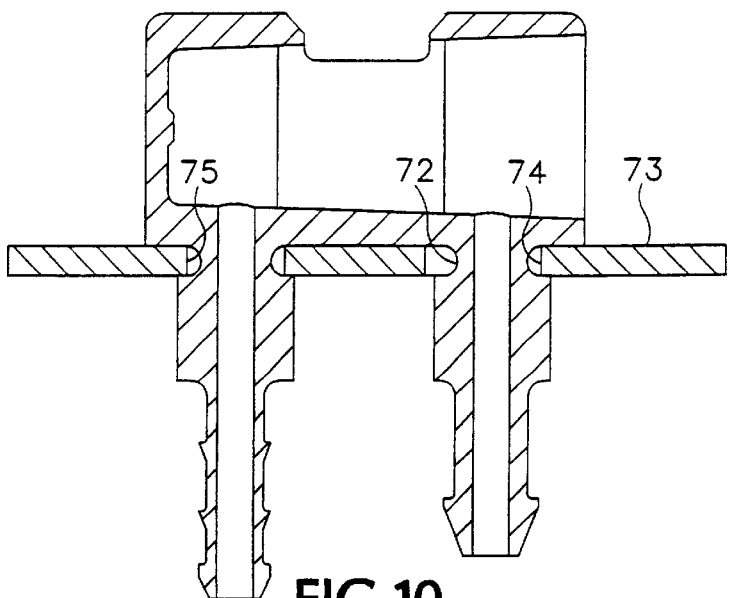

FLUID AND AIR NOZZLE AND METHOD FOR CLEANING VEHICLE LENSES

CROSS-REFERENCE TO RELATED APPLICATIONS

This application is a continuation in part of U.S. patent application Ser. 09/451,257, filed Nov. 29, 1999, now U.S. Pat. No. 6,199,773, which claims priority from U.S. Provisional Patent Application No. 60/138,897 filed Jun. 11, 1999, entitled FLUID AND AIR NOZZLE FOR HEADLIGHT CLEANING.

BACKGROUND OF THE INVENTION

This invention relates to a lens cleaning apparatus and more particularly to a fluid and air nozzle for use with vehicles equipped with both pressurized air systems and pressurized windshield cleaning fluid systems, such as commonly found in commercial transport trucks and certain automobiles.

Due to the excessive mileage that commercial carriers undergo between washings, the headlight, taillight and other lens surfaces of transport trucks frequently become dirty or laden with snow and ice. Devices have been employed that clean headlights and it is known to direct pressurized air and fluid against headlights for this purpose as is shown in U.S. Pat. No. 3,469,088. U.S. Pat. No. 4,026,468 relates to a headlight cleaning assembly that cleans vehicle headlights by using first and second nozzles for jetting an air/fluid mixture against the headlight surface. U.S. Pat. No. 5,083,339 shows a lens cleaning apparatus employing a nozzle which cleans the lens in reciprocating movements of the arm.

A problem with the prior art is that most headlight washer nozzles are custom fitted to certain vehicles in the vicinity of the headlights, and are not adjustable. Thus, these nozzles are not readily fitted to other vehicles for either factory installations or after market installations.

Another problem arises with vehicles employing cameras, such as video cameras, to assist in the driver being able to see blind spots behind and beside the vehicle, as when backing up. Such applications are common in refuse haulers, buses and large recreational vehicles, for example. If the lens becomes dirty from road spray or dust, or the like, the driver's view may be compromised.

SUMMARY OF THE INVENTION

In accordance with the present invention a fluid and air nozzle for lens cleaning systems is provided for use with vehicles that have both pressurized air on board and a pressurized washer system for the windshield wipers. The invention includes a fluid outlet nozzle and an air outlet nozzle contained in a single housing capable of being directly mounted to the outer skin of the vehicle in the vicinity of the lens. The air outlet nozzle is positioned so as to combine its air jet with a jet of cleaning fluid from the fluid outlet nozzle so as to form a spray that impinges forcefully against the lens thereby cleaning the headlight.

In a preferred embodiment, the nozzle is adapted to provide an adjustable trajectory for the spray stream of the combined air and lens cleaning fluid.

It is therefore an object of the invention to provide an improved fluid-air system for cleaning lenses on vehicles.

It a further object of the invention to provide an improved fluid-air system for cleaning dirt, snow and ice from vehicle tail lamps, stop lamps, marker lamps and clearance lamps on vehicles.

A further object of the invention is to provide an improved system for cleaning vehicle camera lenses.

Another object of the invention is to provide an improved system for cleaning vehicle collision avoidance sensors, mirrors and the like.

It is another object of the invention to provide a fluid-air cleaning system for vehicles of the type that have pressurized air on board and also have a manually activated pressurized windshield washer system in combination with the windshield wipers, the washer system having nozzle outlets capable of being mounted adjacent the headlights and also having valve means that automatically activate the lens cleaning system upon activation of the windshield washer system.

Another object of the invention is to provide an improved lens cleaning system for a vehicle that is separate and independent of the vehicle windshield washing system.

A further object of the invention is to provide a fluid-air nozzle for a vehicle lens cleaning system that allows for adjustment of the trajectory of the fluid-air spray stream that impinges upon the lenses.

Yet another object of the invention is to provide a fluid-air nozzle for a vehicle lens cleaning system that allows for positioning the nozzle on the vehicle in the vicinity of a lens to attain optimal cleaning.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a cross-sectional front view of the third embodiment of a fluid-air nozzle illustrating the air passages through the rotatable adjustment spool as taken through line 5—5 of FIG. 4;

FIG. 6 is a cross-sectional view of the third embodiment of a fluid-air nozzle illustrating the fluid passages through the rotatable adjustment spool as taken through line 6—6 of FIG. 4;

FIG. 7 is a bottom view of an exemplary mounting bracket for use with the second and third embodiments of the fluid-air nozzle;

FIG. 8 is a cross-section view of an exemplary mounting bracket with the third embodiment fluid-air nozzle according to the present invention mounted thereon as taken through line 8—8 of FIG. 7;

FIG. 9 is a view of a mounting bracket for use in connection with the invention;

FIG. 10 is a cross-sectional view of the nozzle housing and bracket assembly;

FIG. 11 is a view illustrating use in conjunction with cleaning a vehicle headlamp, stoplamp or the like;

DETAILED DESCRIPTION

Figure 1:
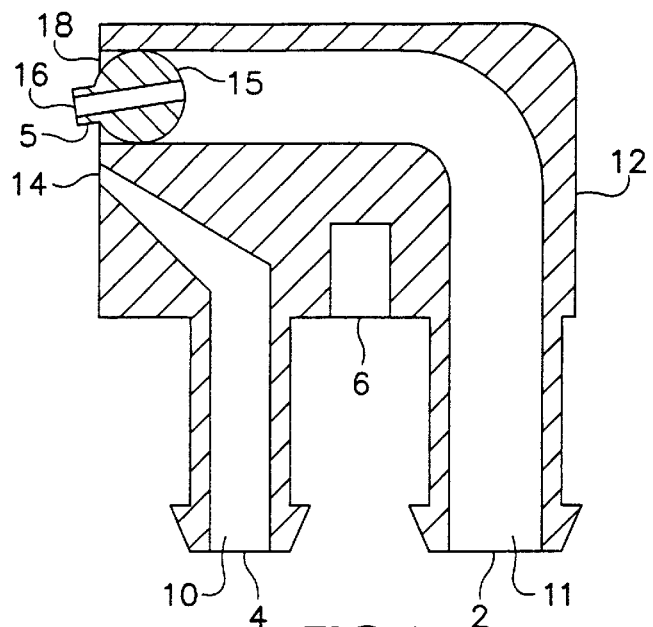
FIG. 1 is a cross-sectional view of a first embodiment of a fluid-air nozzle illustrating the rotatable air spool for adjusting the fluid-air spray trajectory according to the present invention.

In accordance with the present invention, multiple embodiments of a lens cleaning nozzle are shown, wherein the embodiments employ pressurized air, as is typically available for accessory purposes on heavy trucks and certain automobiles, and momentarily pressurized windshield washer fluid, as is typically available on such vehicles for the purpose of cleaning the windshield. The air and washer fluid are ejected from separate orifices in the lens cleaning nozzle merging a short distance therefrom and are and propelled onto the surface of the headlight Referring to FIG. 1, a cross-sectional view of a first embodiment of a fluid-air nozzle, in the first embodiment of the present invention, a nozzle body 12 is configured so as to define air passage 2 and fluid passage 4 therein. Fluid passage 4 defines openings in nozzle body 12 at a fluid inlet fitting 10 and a fluid exit orifice 14. Air passage 2 defines openings in nozzle body 12 at an air inlet fitting 11 and an air exit 18. Air passage 2 houses a cylindrical rotatable air spool 15 in air exit 18 of nozzle body 12. A shoulder 5 is defined along the longitudinal axis of air spool 15. An air exit orifice 16 is formed through air spool 15, centrally located within shoulder 5. A mounting hole 6 is defined in nozzle body 12 between air inlet fitting 11 and fluid inlet fitting 10. The inlets and outlets are at right angles to each other in the illustrated embodiment.

Air spool 15 is frictionally engaged in air passage 2 so as to maintain alignment of air spool 15 within nozzle body 12 in absence of adjustment by a user and to act as a seal forcing all of the air stream through air exit orifice 16. Application of a force (i.e., most likely from a finger) to shoulder 5 of air spool 15 will cause air spool 15 to rotate about its longitudinal axis within air passage 2, thereby altering the trajectory of the air jet therethrough. The amount of rotation that air spool 15 can undergo is limited by the abutment of shoulder 5 against nozzle body 12 in the vicinity of air exit 18. Changing the rotational position of air spool 15 directs the trajectory of the combined fluid-air stream onto the headlight.

Fluid inlet fitting 10 and air inlet fitting 11 are provided with exterior barbs that are intended to accept and retain flexible tubing suitable for the transfer of the fluid and air from the headlight cleaning system to the nozzle body 12. Nozzle body 12 is suitably fastened onto the vehicle skin adjacent to the headlights by a fastening means such as a screw which is frictionally engaged into mounting hole 6. An alternate mounting method would employ a suitable fastening means installed over the shank of air inlet fitting 11 and fluid inlet fitting 10, such as a clamp or a push-on retainer.

Heavy trucks and certain other vehicles have air systems that supply pressurized air to functioning parts of the vehicle as well as a pressurized washer system that is directly associated with windshield wipers. This washer system for the windshield wipers employs an activating switch located in the cab of the vehicle. Activation of this switch simultaneously turns on the reciprocating drive means for the wipers and a pump that supplies washer fluid to the windshield cleaning system and the headlight cleaning system. The fluid pressure within the headlight cleaning system causes an in-line fluid piloted air relay valve to open the air valve. The washer fluid and air are then delivered by suitable tubing to the headlight washer nozzles where the separate air and fluid streams (jets) are ejected from the nozzle so as to intersect. The power resulting from the compressed air expanding disperses the fluid stream thereby determining the spray pattern and trajectory as well as propelling the combined fluid-air stream onto the headlight lenses. A separate headlight washing only system may also be provided to operate independently of the windshield washing system.

Figure 2:
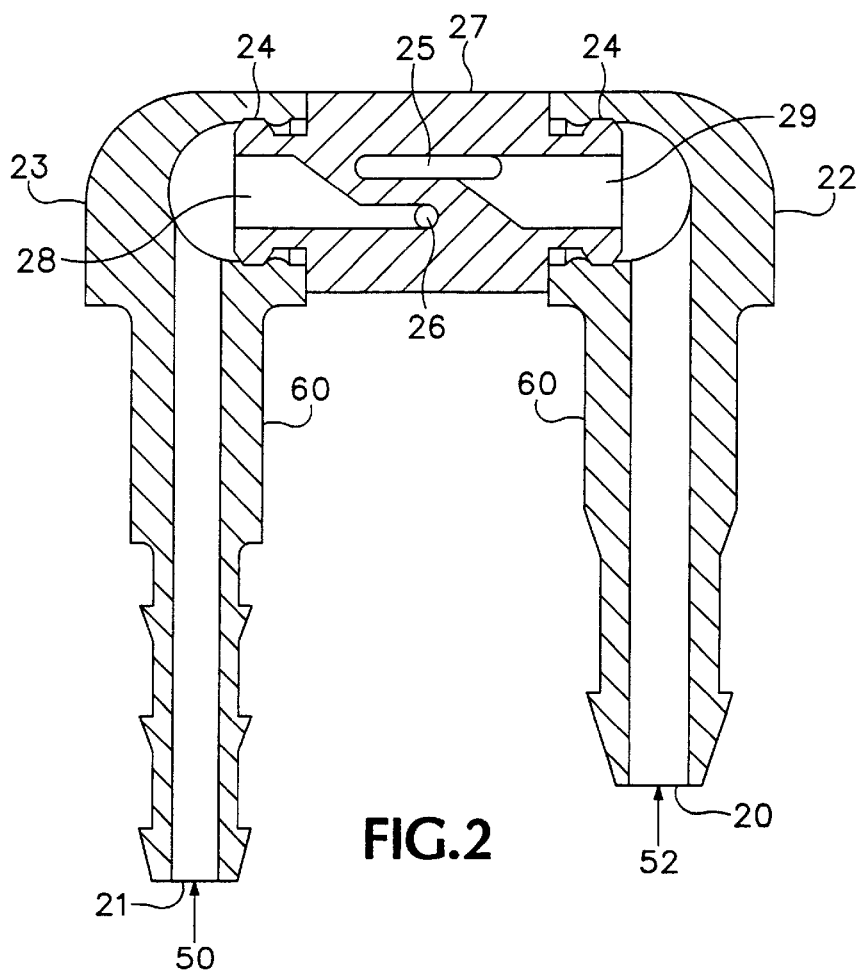
FIG. 2 is a cross-sectional view of a second embodiment of a fluid-air nozzle illustrating the rotatable fluid-air spool for adjusting the trajectory of the fluid-air spray stream according to the present invention.
Figure 3:
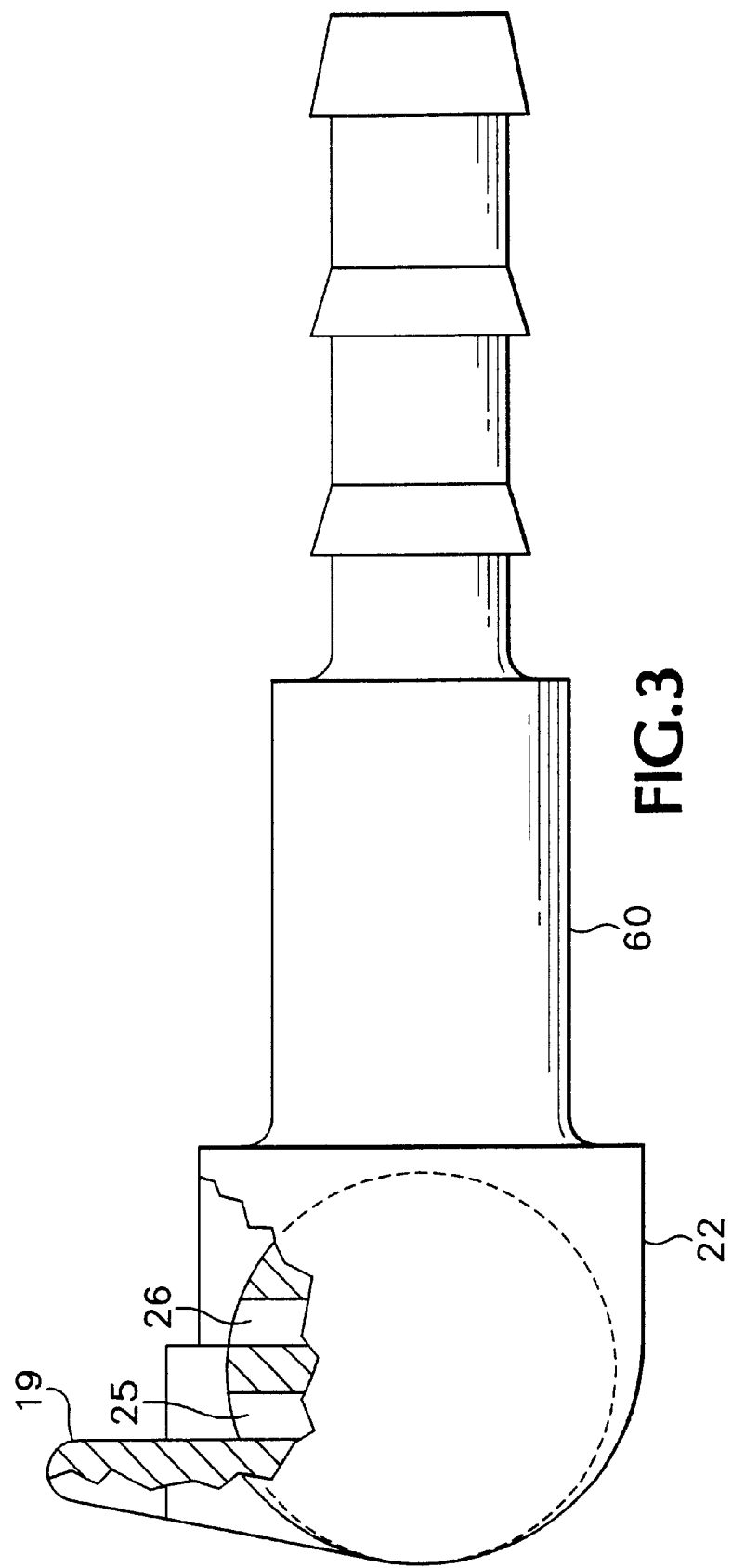
FIG. 3 is a perspective side view of the second embodiment of a fluid-air nozzle illustrating a partial cutaway view of the manual rotatable adjustment spool for adjusting the trajectory of the fluid-air spray stream.

Referring to FIGS. 2 and 3, cross-sectional and perspective side views respectively, illustrating the second embodiment of the present invention, a body is provided having a generally cylindrical rotatable spool 27 therein. One end of rotatable spool 27 contains a fluid flow channel 28 which is oriented generally parallel to the longitudinal axis of spool 27 and terminates at fluid exit orifice 26 approximately midpoint of spool 27. The distal end of spool 27 contains an air flow channel 29 which is oriented generally parallel to the longitudinal axis of spool 27 and terminates at an air exit orifice 25 which is substantially centered above fluid exit orifice 26 and positioned midpoint of spool 27. Both exterior surface ends of spool 27 have a circumferential sealing profile 24 which frictionally connects spool 27 to a fluid endcap 23 and an air endcap 22.

Spool 27 includes two circumferential sealing profiles 24 which accommodate an interference fit between air endcap 22 and fluid endcap 23. Both endcaps are longitudinally bored and have exterior barbs to accommodate suitable transfer hoses for the air and fluid. The interference fit forms an airtight and fluidtight seal and retains fluid endcap 23 and air endcap 22 onto spool 27. Spool 27 is bored from either end so as to have two flow channels, fluid flow channel 28 and air flow channel 29. Fluid flow channel 28 allows fluid stream 50 to transfer from fluid inlet 21 of fluid endcap 23 to the fluid exit orifice 26 at the center of spool 27, and air flow channel 29 allows air stream 52 to transfer from air inlet 20 of air endcap 22 to the air exit orifice 25 at the center of spool 27. Air exit orifice 25 and fluid exit orifice 26 are adjacently positioned and fixedly located midpoint of spool 27. Spool sealing profiles 24 are mated to fluid endcap 23 and air endcap 22 such that spool 27 is able to maintain a fluid and air seal while being rotated relative to the endcaps for the purpose of adjusting the trajectory of both the fluid and air streams. It can therefore be seen that in this nozzle embodiment, the trajectory of both the fluid stream 50 and air stream 52 can simultaneously be adjusted by rotating spool 27 about its axis.

Fluid exit orifice 26 gives the fluid stream a trajectory parallel to the air stream. Air exit orifice 25 directs the air toward the headlight surface and is fashioned such that the exiting and expanding air stream is formed into a somewhat wide, flattened shape for cleaning the maximum possible area of the headlight. An adjustment tab 19 protrudes from spool 27 for manual rotation of spool 27, thereby allowing the adjustment of the trajectory of the fluid-air stream.

This embodiment of the headlight washer nozzle can suitably be mounted to the vehicle by insertion of air endcap 22 and fluid endcap 23 through holes drilled in the skin of the vehicle and placement of a suitable fastener onto boss 60 of each endcap. The headlight washer nozzle may also be mounted onto a pedestal bracket 64 (as discussed hereinbelow in connection with FIG. 8).

Figure 4:
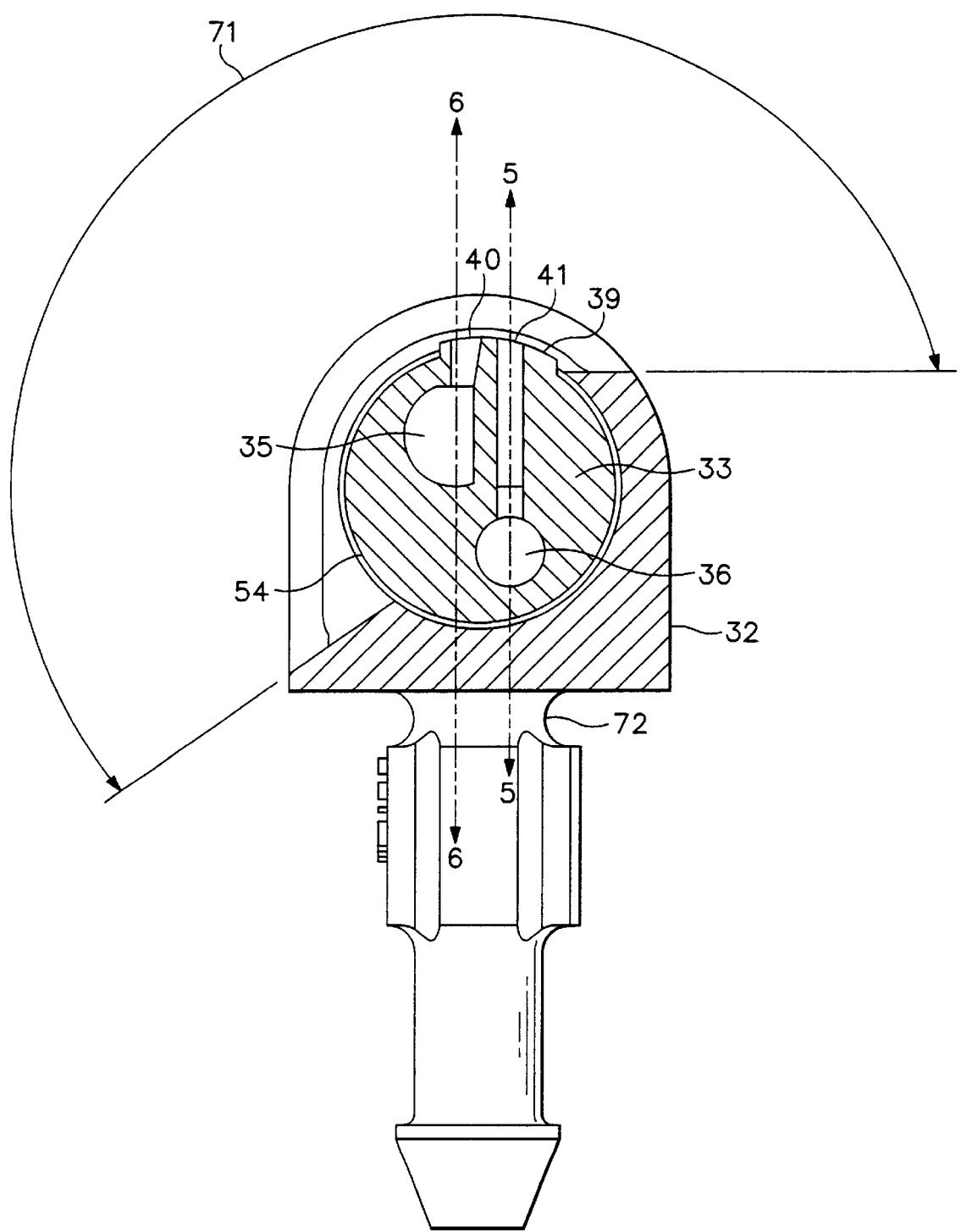
FIG. 4 is a cross-sectional side view taken midpoint of a third embodiment of a fluid-air nozzle illustrating the general design of the rotatable adjustment spool within the nozzle housing according to the present invention.

Referring now to FIGS. 4–6, which comprise sectional views of a third embodiment of the present invention, rotatable spool 33 is frictionally secured within spool recess 54 of nozzle housing 32 by spool sealing profiles 34 located circumferentially on rotatable spool 33. Perpendicular to the longitudinal axis of spool 33, nozzle housing 32 incorporates longitudinally bored air inlet fitting 30 and longitudinally bored fluid inlet fitting 31. Spool 33 contains axially bored air flow channel 36 that perpendicularly intersects air transfer channel 56 and air outlet orifice 41. Spool 33 also contains axially bored fluid flow channel 35 that perpendicularly intersects fluid transfer channel 58 and fluid outlet orifice 40.

It can be seen that the function of the third embodiment of the headlight washer nozzle is correspondent to that of the second embodiment in that each of these embodiments has a rotatable spool 33 that transmits the air and fluid from their respective inlet fittings to their respective outlet orifices.

This embodiment of the adjustable nozzle uses a single piece housing 32 which incorporates both air inlet fitting 30 and fluid inlet fitting 31. Nozzle housing 32 has a spool recess 54 bored therein to frictionally receive spool 33. Spool 33 has three circumferential spool sealing profiles 34 which compress to create seals for the compressed air and fluid when spool 33 is installed into spool recess 54. Seal profiles 34 also serve as sliding surfaces on which spool 33 can revolve within nozzle housing 32. The compression of seal profiles 34, while allowing the spool to be rotated, also frictionally prevents spool 33 from coming out of alignment within nozzle housing 32 due to mechanical vibration.

Perpendicular to the axis of spool 33, nozzle housing 32 incorporates longitudinally bored air inlet fitting 30 and longitudinally bored fluid inlet fitting 31. Spool 33 has longitudinally bored air flow channel 36 that perpendicularly intersects air transfer channel 56 and air outlet orifice 41. This enables the transfer of air from air inlet fitting 30 through to air outlet orifice 41 located midpoint on spool 33, throughout the available range of rotation of spool 33. Spool 33 also has a longitudinally bored fluid flow channel 35 that intersects perpendicular fluid transfer channel 58 and perpendicular fluid outlet orifice 40. This enables the transfer of fluid from fluid inlet fitting 31 through to fluid outlet orifice 40 located midpoint on spool 33 throughout the available range of rotation of spool 33. Fluid outlet orifice 40 is located adjacent to air outlet orifice 41. The fluid flow and air flow are separate within nozzle housing 32 and are mixed upon ejection from their respective outlet orifices in spool 33.

Fluid outlet orifice 40 directs a jet of fluid toward the headlight lens. Air outlet orifice 41 directs air toward the headlight and is configured such that the exiting and expanding air stream is formed into a wide, flattened shape for cleaning the maximum possible area of the headlight lens. Spool 33 is rotatable within nozzle housing 32 for the purpose of adjusting the nozzle orifices so that the fluid and air stream trajectory impinges upon the headlight surface in a manner to provide effective cleaning for a wide variety of vehicle applications. Spool 33 is rotated via screw driver slot 37. Slot 37 is aligned with exit orifices 40 and 41, thereby providing a means of visually indicating the direction of the fluid and air stream.

Spool 33 is retained in housing 32 by raised shoulder 70 which is centrally located on the surface of spool 33 and through which air outlet orifice 41 and fluid outlet orifice 40 extend. Shoulder 70 contributes to the interference fit of spool 33 into spool recess 54 and prevents spool 33 removal. Shoulder 70 makes contact with nozzle housing 32 at the extremes of its rotational range, thereby providing rotational travel stops. These rotational stops maintain the nozzle orifices within an exit window 71 of the housing. Spool 33 may be retained in housing 32 by other means such as a snap-fit or by addition of a suitable fastener such as a pin or a screw or a retaining ring.

Nozzle housing 32 may be mounted by various methods, dependent upon the physical characteristics of the area surrounding the headlight it is intended to clean. One method is to fasten the nozzle assembly directly to the vehicle skin in a position adjacent to the headlight. Nozzle housing 32 incorporates bosses 38 at the base of inlet fittings 30 and 31 that accept suitable fasteners, for example, of either the push-on or self-threading screw-on variety. The purpose of this fastener is to secure the nozzle to the vehicle once nozzle fittings 30 and 31 are inserted through holes drilled through the vehicle skin.

The design of air inlet fitting 30 and fluid inlet fitting 31 corresponds to those of the other embodiments with respect to the barb profiles for hose attachment. One method of mounting the nozzle housing 32 to the vehicle skin is substantially similar to that method of affixation described in the previous embodiment.

Another manner of mounting, with reference to FIG. 6, together with FIG. 9, a view of a mounting bracket for use in connection with the invention and FIG. 10, a cross-sectional view of the nozzle housing and bracket assembly, is accomplished via a groove 72 added where housing 32 and bosses 38 join. The grooves 72 mate with hole 74 and slot 75 in mounting bracket 73. Holes 76 are provided in bracket 73 to give clearance for a fastener, such as a screw, for attaching the nozzle and bracket assembly to the vehicle. Together, these two components provide a manner of securing the nozzle assembly to a vehicle skin where it might not be possible to install push-on retainers, due to accessibility constraints. The illustrated bracket mounting structure may also be used to secure the nozzle assembly to a standoff.

Referring now to FIGS. 7 and 8, an example of a mounting bracket for use with the second and third embodiment of the present invention is shown. The mounting bracket 64 has a pedestal configuration with two tapered holes 62 therethrough and two mounting holes 66 therein. Where an optimal skin-mounted location is impractical, nozzle housing 32 may be installed atop bracket 64 in order to attain the necessary attitude for optimal headlight cleaning. A suitable means of securing the nozzle assembly to bracket 64 is provided, as well as a means of securing bracket 64 and the nozzle assembly to the vehicle. One manner of securing the nozzle to bracket 64 is by a press fit, where the tubing is forced into restricted diameter bore 62 of bracket 64. This may also be accomplished by means of a suitable fastener, an example of such being a common set screw or retaining pin. Adhesive bonding is another possible fastening means. Bracket 64 may be affixed by one or more fasteners, threaded or otherwise. One possibility is shown in FIGS. 7 and 8, wherein tapped holes 66 are provided for securing the bracket to the vehicle skin with threaded fasteners. Another manner is to incorporate plain holes with the use of self-threading fasteners.

Other variations to the illustrated design may be made while retaining the function of the invention. For example, the sealing function of the circumferential seals may also be accomplished by the addition of elastomeric O-rings or other corresponding seals. Also, as noted hereinabove, other ways to retain the spool in the housing may be used, such as by a snap fit or by the addition of a fastener such as a roll pin, retaining ring or screw.

Figure 11:
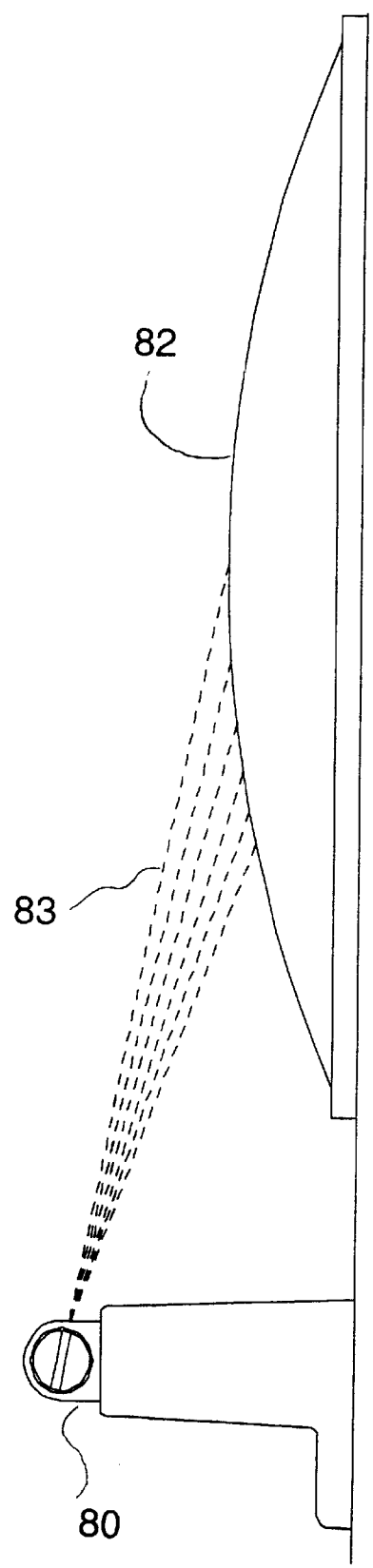

Regardless of which embodiment of the headlight washer nozzle is used, operation of the headlight cleaning system is substantially correspondent between the various embodiments and proceeds as discussed herein. (This headlight cleaning system and the corresponding relay valve are described in U.S. Pat. No. 5,657,929, issued Aug. 19, 1997, assigned to the assignee of the present application and herein incorporated by reference.) While the above embodiments have been directed principally to cleaning of headlights, an improved variation of the invention employs the nozzles and systems for cleaning purposes for removing dirt, snow, and ice from vehicle tail lamps, stop lamps, marker and clearance lamps. Snow and dirt on tail lamp lenses obscures their view from vehicles behind them. Therefore, employing the devices for cleaning these parts of vehicles provides an advantage. FIG. 11 illustrates the use in conjunction with cleaning a vehicle lamp, wherein the nozzle 80 is mounted near the lamp 82, and a cleaning blast 83 clears the lens of dirt, snow, ice, etc. The cleaning fluid may be heated if desired, by use of a heating device 84 (FIG. 14), which heats the cleaning fluid on demand, or, which pre-heats a reservoir of cleaning fluid and maintains the fluid at a desired temperature until dispensing.

The operation of the cleaning system may be accomplished a number of ways, both manual and automatic. First, it may be operated automatically each time the windshield washer is operated, utilizing the afore-mentioned relay valve as describe previously for headlamp cleaning. This system has the advantage of cleaning the targeted lamp when most needed in wet weather conditions.

Figure 14:
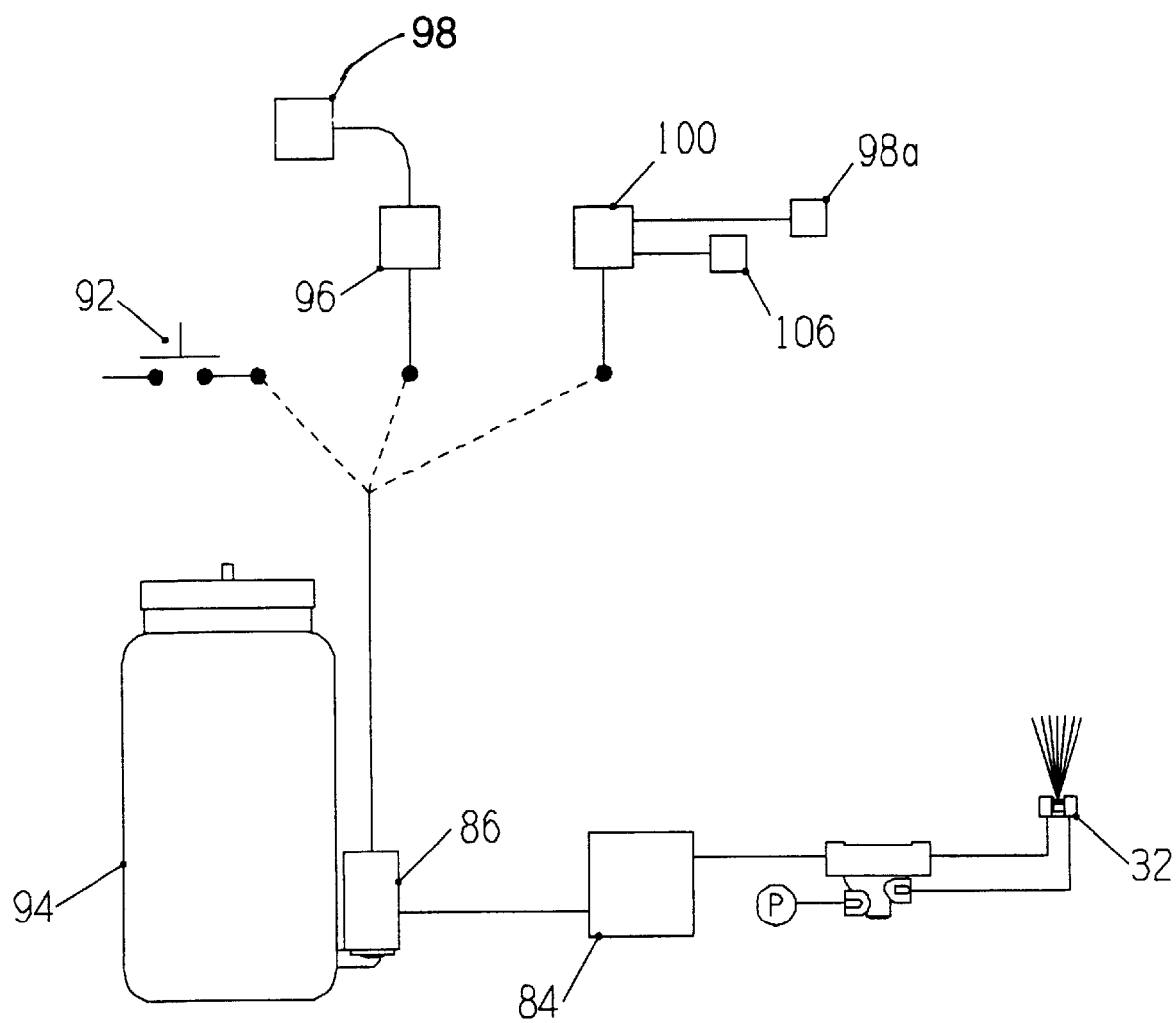
FIG. 14 is a diagram showing both manual and automatic variations of the lens cleaning system.

FIG. 14 shows a second embodiment where the lens cleaning system has its own pump 86, and optionally its own reservoir 94. It may be manually actuated by use of an operator-controlled switch 92 mounted on the vehicle dash, for example. Alternately, it may be operated automatically, with the cleaning function occurring at regularly timed intervals. This automatic system comprises a timer circuit 96 that controls the duration of cleaning cycles and the intervals between cleaning cycles. It is controlled in turn by an operator-controlled switch 98 mounted on the vehicle dash, said intervals being adjustable and able to be turned off or on by an operator, if desired.

Another system of initiating automatic operation is by using the electrical signal from the vehicle stoplamp circuit. This system of control provides for cleaning of stoplamps or taillamps or the like when the vehicle's brakes are applied, having the advantage of cleaning the lamps when they most need to be seen. In order to prevent unnecessary cleaning during repeated braking an interval timing feature of the embodiment of FIG. 14 would be utilized. In this embodiment, the timing control circuit 100 receives the stoplamp signal from the stoplamp switch 106. The cleaning cycle is initiated and the interval timer is started to prevent further cleaning cycles regardless of braking function. After the interval timer is done, the next braking event will again trigger the cleaning function. The automatic system can be overridden by the operator with a dash switch 98a, to either de-activate it completely, or to intersperse manual cleaning operations between any intervals of automatic cleaning.

Figure 12:
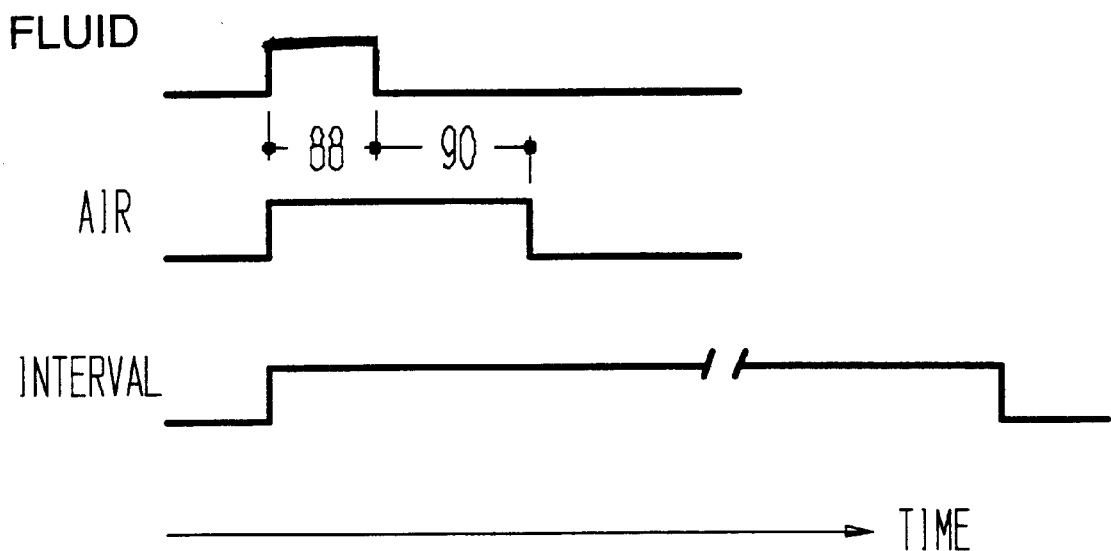
FIG. 12 is chart showing the sequence of air and fluid flow in a fully automatic embodiment lens cleaning system.
Figure 15:
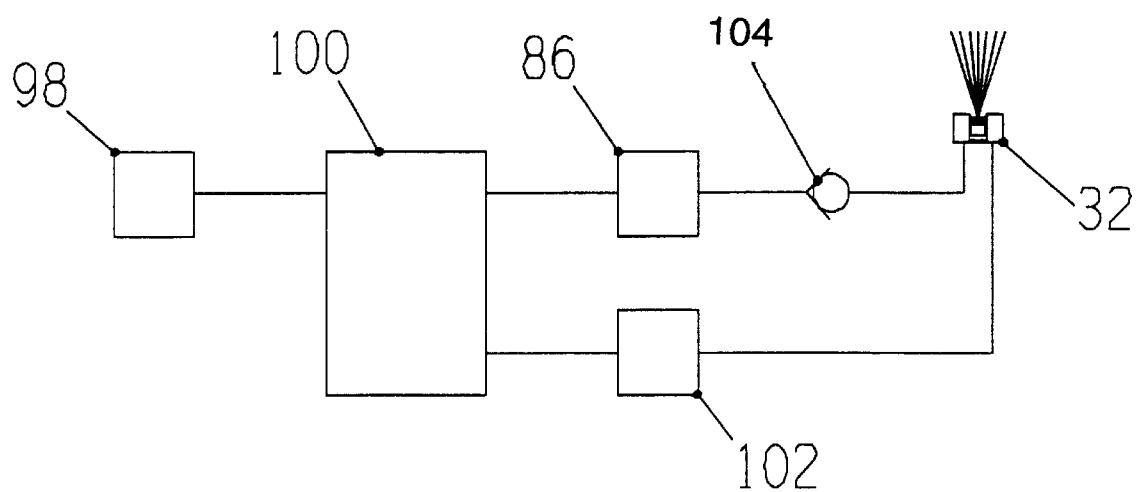
FIG. 15 is a block diagram another automatic version of the lens cleaning system.

A further embodiment employs the cleaning system to clean camera lenses of the type used on vehicles for the purpose of providing visibility in blind spots and for rearward visibility when backing. In this embodiment, a cleaning blast of fluid and air is followed by a blast of air only, so that any fluid droplets remaining on the lens are blown off the lens. A timing chart of the cleaning process in this embodiment is shown in FIG. 12, wherein the cleaning step is performed using the liquid and air blast combination during an interval 88. Next, a step is performed wherein an air only blast is continued (the fluid having been shut off) during an interval 90, following the fluid/air blast of interval 88. The air only blast is directed to the lens, to blow off any remaining droplets of cleaning fluid. The control system for this embodiment is shown in FIG. 15 block diagram where the timing control circuit 100 initiates the cleaning cycle automatically to repeat at a pre-set or an adjustable interval 91 (FIG. 12), such as 10 to 60 minutes, the washer fluid pump 86 is turned on and, simultaneously, the air solenoid 102 is opened and air and fluid are spayed through nozzle 32. After the cleaning cycle of 2 to 6 seconds, the control circuit 100 turns off the fluid pump 86. The air continues to flow through the nozzle for 2 to 6 seconds additional time until the control circuit 100 turns it off. When the system is not operating, check valve 104 prevents the force of gravity from draining fluid from the reservoir. The automatic system can be overridden by the operator with a dash switch 98, to adjust the duration of spray, interval between sprays, to deactivate it completely, or to intersperse manual cleaning operations between any intervals of automatic cleaning. This control system may be employed with any of the above-mentioned applications.

Figure 13:
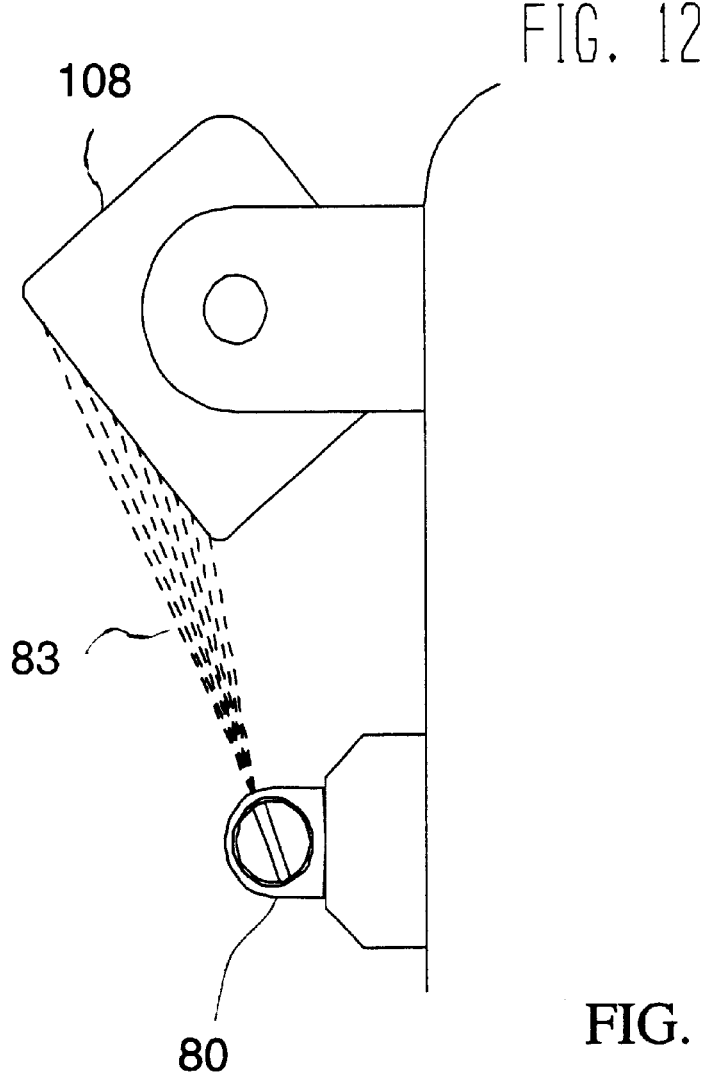
FIG. 13 is a view illustrating the use for cleaning a vision system lens.

Still another application is for use on a collision avoidance sensor, to maintain the cleanliness of the sensor for improved operation. Side mirrors, windshields and the like are also suitably cleaned in accordance with the system. Suitably any type of vision devices, visible indicator or sensor that is both outside a vehicle and sensitive to dirt or ice or snow accumulation thereon may employ the air-liquid nozzle cleaning system for improved operation. FIG. 13 illustrates such a use, wherein a vision device 108 is suitably cleaned by cleaning spray 83 as delivered by nozzle 80.

An advantage of using the system for these applications is that the use of both pressurized air and washer fluid quickly clears the target of ice, dirt and snow, to enhance the visibility provided to the operator, without the vehicle operator having to leave the cab of the vehicle.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for cleaning a vehicle vision device, visible indicator, or sensor, comprising:

providing a fluid-air nozzle near the vision device, visible indicator, or sensor; and directing a jet of air from said fluid-air nozzle and a jet of cleaning fluid from said fluid-air nozzle so said jet of cleaning fluid intersects with said jet of air so as to form a spray mixture that is propelled toward said vision device, visible indicator, or sensor of the vehicle, further comprising the step of directing a jet of air substantially in absence of a jet of fluid, after said step of directing a jet of air and a jet of cleaning fluid.

2. The method according to claim 1 wherein said vision device, visible indicator, or sensor comprises a marker light lens.

3. The method according to claim 1 wherein said vision device, visible indicator, or sensor comprises a windshield.

4. The method according to claim 1 wherein said vision device, visible indicator, or sensor comprises a camera.

5. The method according to claim 1 wherein said vision device, visible indicator, or sensor comprises a collision avoidance sensor.

6. The method according to claim 1 wherein said vision device, visible indicator, or sensor comprises a mirror.

7. The method according to claim 1 wherein said vision device, visible indicator, or sensor comprises a mirror-mounted display or indicator.

8. The method according to claim 1 wherein said vision device, visible indicator, or sensor comprises a tail lamp lens.

9. The method according to claim 1 wherein said vision device, visible indicator, or sensor comprises a stop lamp lens.

10. The method according to claim 1 wherein said vision device, visible indicator, or sensor comprises a clearance lamp lens.

11. The method according to claim 1, further comprising the step of performing said cleaning steps automatically.

12. The method according to claim 11, wherein said automatic cleaning step may be activated or deactivated by a vehicle operator.

13. The method according to claim 1, further comprising the step of performing said cleaning steps when a vehicle brake system is activated.

14. The method according to claim 1, further comprising the step of performing said cleaning steps at timed intervals.

15. The method according to claim 14, wherein said intervals are adjustable.

16. The method according to claim 1, further comprising the step of heating said fluid.

17. The method for cleaning a vehicle vision device, visible indicator, or sensor according to claim 1,
wherein said performing of said cleaning steps may be activated or deactivated by a vehicle operator.

18. A method for cleaning a vehicle vision device, visible indicator, or sensor, comprising:
providing a fluid-air nozzle near the vision device, visible indicator, or sensor; and
directing a jet of air from said fluid-air nozzle and a jet of cleaning fluid from said fluid-air nozzle so said jet of cleaning fluid intersects with said jet of air so as to form a spray mixture that is propelled toward said vision device, visible indicator, or sensor of the vehicle, wherein said nozzle comprises:
a rotatable spool with an air outlet orifice and a fluid outlet orifice;
an air endcap; and
a fluid endcap.

19. The method according to claim 18 wherein said spool comprises:
a first circumferential sealing surface that frictionally engages said air endcap to said spool; and
a second circumferential sealing surface that frictionally engages said fluid endcap to said spool,
wherein said sealing surfaces act as seals between said spool and said endcaps, and maintain a surface for rotation of said spool.

20. The method for cleaning a vehicle vision device, visible indicator, or sensor according to claim 18,
wherein said performing of said cleaning steps may be activated or deactivated by a vehicle operator.

21. A fluid-air cleaning nozzle for cleaning a vehicle vision device, visible indicator, mirror, or sensor, said nozzle comprising:
a fluid-air nozzle body with an air inlet fitting and a fluid inlet fitting; and
a rotatable spool with an air outlet orifice and a fluid outlet orifice,
wherein a jet of air from said air outlet orifice intersects a jet of cleaning fluid from said fluid outlet orifice so as to form a spray mixture that is directed toward a vision device, visible indicator, mirror, or sensor of a vehicle.

22. The fluid-air cleaning nozzle for cleaning a vehicle vision device, visible indicator, mirror, or sensor according to claim 21 further comprising a mounting means capable of mounting said fluid-air nozzle body on a vehicle.

23. The air-fluid cleaning nozzle for cleaning a vehicle vision device, visible indicator, mirror, or sensor according to claim 21 wherein said nozzle is adapted for use in cleaning systems on vehicles of the type which have pressurized air on board and also a pressurized washer system for windshield wipers.

24. The air-fluid cleaning nozzle for cleaning a vehicle vision device, visible indicator, mirror, or sensor according to claim 21 wherein said spool comprises a plurality of circumferential sealing surfaces that frictionally engage said fluid-air nozzle body to act as a seal between said spool and said nozzle body and to maintain alignment of said spool within said nozzle body.

25. The air-fluid cleaning nozzle for cleaning a vehicle vision device, visible indicator, mirror, or sensor according to claim 21 wherein said spool comprises a shoulder that abuts said nozzle body thereby acting as rotational travel stop for said spool, and preventing the removal of said spool from said nozzle body.

26. The air-fluid cleaning nozzle for cleaning a vehicle vision device, visible indicator, mirror, or sensor according to claim 21 wherein at least one of said sealing surfaces comprises an elastomeric o-ring.

27. The air-fluid cleaning nozzle for cleaning a vehicle vision device, visible indicator, mirror, or sensor according to claim 21 further comprising a snap fit member for preventing the removal of said spool from said nozzle body.

28. The air-fluid cleaning nozzle for cleaning a vehicle vision device, visible indicator, mirror, or sensor according to claim 21 further comprising a roll pin for preventing the removal of said spool from said nozzle body.

29. The air-fluid cleaning nozzle for cleaning a vehicle vision device, visible indicator, mirror, or sensor according to claim 21 further comprising a retaining ring for preventing the removal of said spool from said nozzle body.

30. The air-fluid cleaning nozzle for cleaning a vehicle vision device, visible indicator, mirror, or sensor according to claim 21 further comprising a screw member for preventing the removal of said spool from said nozzle body.

* * * * *